United States Patent
Ferrara et al.

(10) Patent No.: US 12,126,839 B2
(45) Date of Patent: Oct. 22, 2024

(54) WEIGHTED DOWNSAMPLING AND WEIGHTED TRANSFORMATIONS FOR SIGNAL CODING

(71) Applicant: V-NOVA INTERNATIONAL LIMITED, London (GB)

(72) Inventors: Simone Ferrara, London (GB); Guido Meardi, London (GB)

(73) Assignee: V-Nova International Limited, London (GB)

( * ) Notice: Subject to any disclaimer, the term of this patent is extended or adjusted under 35 U.S.C. 154(b) by 0 days.

(21) Appl. No.: 17/282,445

(22) PCT Filed: Oct. 2, 2019

(86) PCT No.: PCT/GB2019/052783
§ 371 (c)(1),
(2) Date: Apr. 2, 2021

(87) PCT Pub. No.: WO2020/070495
PCT Pub. Date: Apr. 9, 2020

(65) Prior Publication Data
US 2021/0385501 A1    Dec. 9, 2021

(30) Foreign Application Priority Data

Oct. 3, 2018 (GB) .................................. 1816172
Oct. 6, 2018 (GB) .................................. 1816328

(51) Int. Cl.
*H04N 19/117* (2014.01)
*H04N 19/136* (2014.01)
(Continued)

(52) U.S. Cl.
CPC .......... *H04N 19/85* (2014.11); *H04N 19/117* (2014.11); *H04N 19/136* (2014.11); *H04N 19/14* (2014.11); *H04N 19/60* (2014.11)

(58) Field of Classification Search
CPC .... H04N 19/85; H04N 19/117; H04N 19/136; H04N 19/60
(Continued)

(56) References Cited

U.S. PATENT DOCUMENTS

2007/0160134 A1* 7/2007 Segall ................. H04N 19/59
375/240.1
2013/0314496 A1* 11/2013 Rossato ............... H04N 19/30
348/43
(Continued)

FOREIGN PATENT DOCUMENTS

WO    2013-171173    11/2013

OTHER PUBLICATIONS

Johannes Kopf, Ariel Shamir, Pieter Peers, "Content-Adaptive Image Downscaling", ACM Transactions on Graphics "Proceedings of SIGGRAPH Asia", 2013 (Year: 2013).*
(Continued)

*Primary Examiner* — Ayman A Abaza
(74) *Attorney, Agent, or Firm* — Workman Nydegger (57) ABSTRACT

Techniques for encoding a signal are described. A signal is down-sampled to generate a version of the signal. This version of the signal is then encoded to produce a first encoded signal. The first encoded signal is then decoded to produce a first decoded signal. The second decoded signal is up-sampled to obtain a first up-sampled decoded signal. A first residual signal is obtained by taking a difference between the first up-sampled decoded signal and a first reference signal. The first reference signal corresponds to the signal prior to down-sampling. The first residual signal is encoded to produce a first encoded residual signal. The first encoded residual signal and the first encoded signal may be received and decoded by a decoder to reconstruct the signal. The signal may comprise a set of frames of video.

15 Claims, 3 Drawing Sheets

(51) Int. Cl.
*H04N 19/14* (2014.01)
*H04N 19/60* (2014.01)
*H04N 19/85* (2014.01)

(58) Field of Classification Search
USPC .................................................. 375/240.18
See application file for complete search history.

(56) References Cited

U.S. PATENT DOCUMENTS

2014/0269897 A1* 9/2014 Baylon ................ H04N 19/187
375/240.02
2015/0271525 A1* 9/2015 Hendry ................ H04N 19/107
375/240.27

OTHER PUBLICATIONS

International Search Report and Written Opinion for PCT/GB2019/052783 mailed Jan. 7, 2020.
Johannes, et al., "Content-adaptive image downscaling", ACM Transactions on Graphics, ACM, 2 Penn Plaza, Suite 701, New York, NY 10121-0701, USA, vol. 32, No. 6, Nov. 1, 2013, pp. 1-8, EP058033866, ISSN: 0730-0301, DOI: 10.1145/2508363.2508370.
Schwarz, et al., "Overview of the Scalable Video Coding Extension of the H.264/AVC Standard", IEEE Transactions on Circuits and Systems for Video Technology, vol. 17, No. 9, Sep. 1, 2007, pp. 1103-1120, XP55378169, US ISSN: 1051-8215, DOI: 10.1109/TCSVT.2007.905532.
Examination Report for GB 2106340.9 mailed Apr. 22, 2022.

* cited by examiner

WEIGHTED DOWNSAMPLING AND WEIGHTED TRANSFORMATIONS FOR SIGNAL CODING

CROSS-REFERENCE TO RELATED APPLICATIONS

The present application is a 371 US Nationalization of International Patent Application No. PCT/GB2019/052783, filed Oct. 2, 2019, which claims priority to United Kingdom Patent Application Nos. 1816328.7, filed Oct. 6, 2018, and 1816172.9, filed Oct. 3, 2018. The entire disclosures of the above-identified patent applications are hereby incorporated by reference.

TECHNICAL FIELD

The present invention relates to methods for encoding and decoding signals. Processing data may include, but is not limited to, obtaining, deriving, outputting, receiving and reconstructing data.

BACKGROUND

There is a need to create flexible solutions to signal encoding and decoding schemes, particularly in the field of video encoding and decoding. Also, it is important to provide the highest quality video output to viewers wherever possible, and to do so in a way that is backward compatible with existing technologies and decoder hardware.

It is an aim of this disclosure to provide a solution to one or more of these needs.

WO 2014/170819 A1 describes computer processor hardware that parses a data stream into first portions of encoded data and second portions of encoded data. The computer processor hardware implements a first decoder to decode the first portions of encoded data into a first rendition of a signal and a second decoder to decode the second portions of encoded data into reconstruction data. The reconstruction data specifies how to modify the first rendition of the signal. The computer processor hardware and applies the reconstruction data to the first rendition of the signal to produce a second rendition of the signal.

SUMMARY

There is provided a method, computer program, computer-readable medium, and encoder as set out in the appended claims.

DETAILED DESCRIPTION

Figure 1:
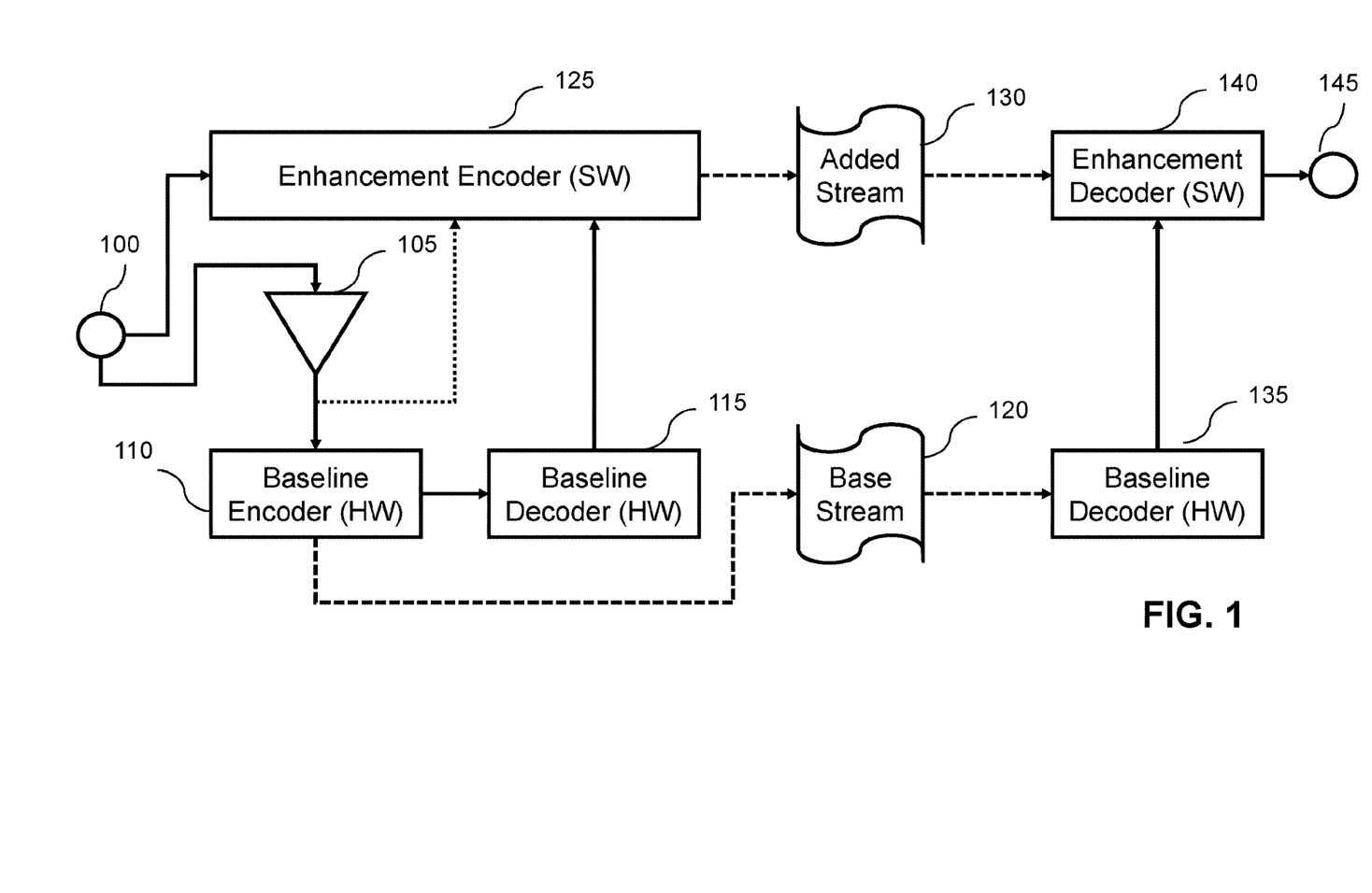
FIG. 1 is a schematic illustration showing an embodiment associated with the methods of encoding and decoding.

In the present disclosure, a method of encoding and decoding is described. FIG. 1 shows one embodiment associated with the methods of encoding and decoding.

In FIG. 1, an input signal 100 is received by an encoding system. The encoding system consists of a down-sampler 105, a baseline encoder 110, a baseline decoder 115 and an enhancement encoder 125. The baseline encoder 110 and the baseline decoder 115 may be implemented in hardware (HW) and the enhancement encoder 125 may be implemented using software (SW). The input signal 100 may be a video sequence, i.e. a sequence of frames where each frame comprises a two-dimensional array of signal elements such as pixels.

In FIG. 1, the input signal 100 is received by both the down-sampler 105 and the enhancement encoder 125. The input signal 100 is initially down-sampled using the down-sampler 105. Here the term "down-sampling" is to be understood as used in the art of signal processing, e.g. reducing a resolution or dimensionality of the input signal 100. For a video sequence, this may comprise generating a version of an original frame of video that has a resolution in one or more directions that is less than the original frame. For example, down-sampling a 640 by 480 frame by a factor of 2 may generate a 320 by 240 frame. In another way, down-sampling may be seen as reducing a number of sample elements within the signal by a defined factor. Down-sampling may be performed for one or more dimensions of an n-dimensional signal.

Returning to FIG. 1, the resulting down-sampled version of the input signal is fed to the baseline encoder 110. The baseline encoder 110 encodes the down-sampled version of the input signal to generate an encoded base data stream 120. This may be considered a first encoded signal. The encoded base data stream 120 is outputted from the baseline encoder 115. The encoded base data stream 120 may form a first portion of a bitstream, e.g. for transmission or communication to a decoder. The encoded base data stream 120 output from the baseline encoder is also fed to the baseline decoder 115 within the encoding system. The output of the baseline decoder 115 is then fed to the enhancement encoder 125. The baselines decoder 115 may be thought of as providing a signal output that simulates decoding by a decoding system.

The enhancement encoder 125 receives the input signal 100 and the output of the baseline decoder 115. Optionally, the enhancement encoder 125 may receive the down-sampled version of the input signal. The enhancement encoder processes the various inputs to generate an encoded added data stream 130. The encoded added data stream 130 may be seen as an enhancement data stream. The encoded added data stream 130 may be output as a second portion of a bitstream. In certain cases, the first and second portions of a bitstream, i.e. the encoded base stream 120 and the encoded added data stream 130 may be combined into a single bit stream. In other cases, the first and second portions of a bitstream, i.e. the encoded base stream 120 and the encoded added data stream 130 may be transmitted as independent bit streams (e.g. two bit streams). In certain cases, the two portions of the bitstream (or to independent bit streams) may be identified using respective identifiers, e.g. the first portion may be identified using a first identifier and the second portion may be identified using a second identifier.

FIG. 1 also shows a corresponding decoding system. The corresponding decoding system comprises a baseline decoder 135 and an enhancement decoder 140. As for the encoding system, the baselines decoder 135 may be implemented in hardware (HW) and the enhancement decoder 140 may be implemented in software (SW). At the decoding system, the encoded base data stream 120 is fed to the baseline decoder 135 which decodes said stream to generate a baseline decoded stream. The baseline decoded stream is fed to the enhancement decoder 140, which also receives the encoded added data stream 130. The enhancement decoder 140 processes the baseline decoded stream and the encoded added data stream 130 to generate a decoded data stream 145. This may comprise, for example, a decoded video sequence for display.

The baseline decoder 135 may be a version of, or identical to, the baseline decoder 115 within the encoding system. As such, the output of the baseline decoder 115 that is received by the enhancement encoder 125 may resemble the output of the baseline decoder 135 that is received by the enhancement decoder 140. The enhancement encoder 125 uses the output of the baseline decoder 115 to generate the encoded added data stream 130.

In one case, the baseline encoder 110 and/or the baseline decoder or decoders 115 and 135 are preferably implemented using hardware blocks, for example digital signal processing modules on a chipset. The enhancement encoder 125 and/or the enhancement decoder 140 are preferably implemented in software.

Figure 2:
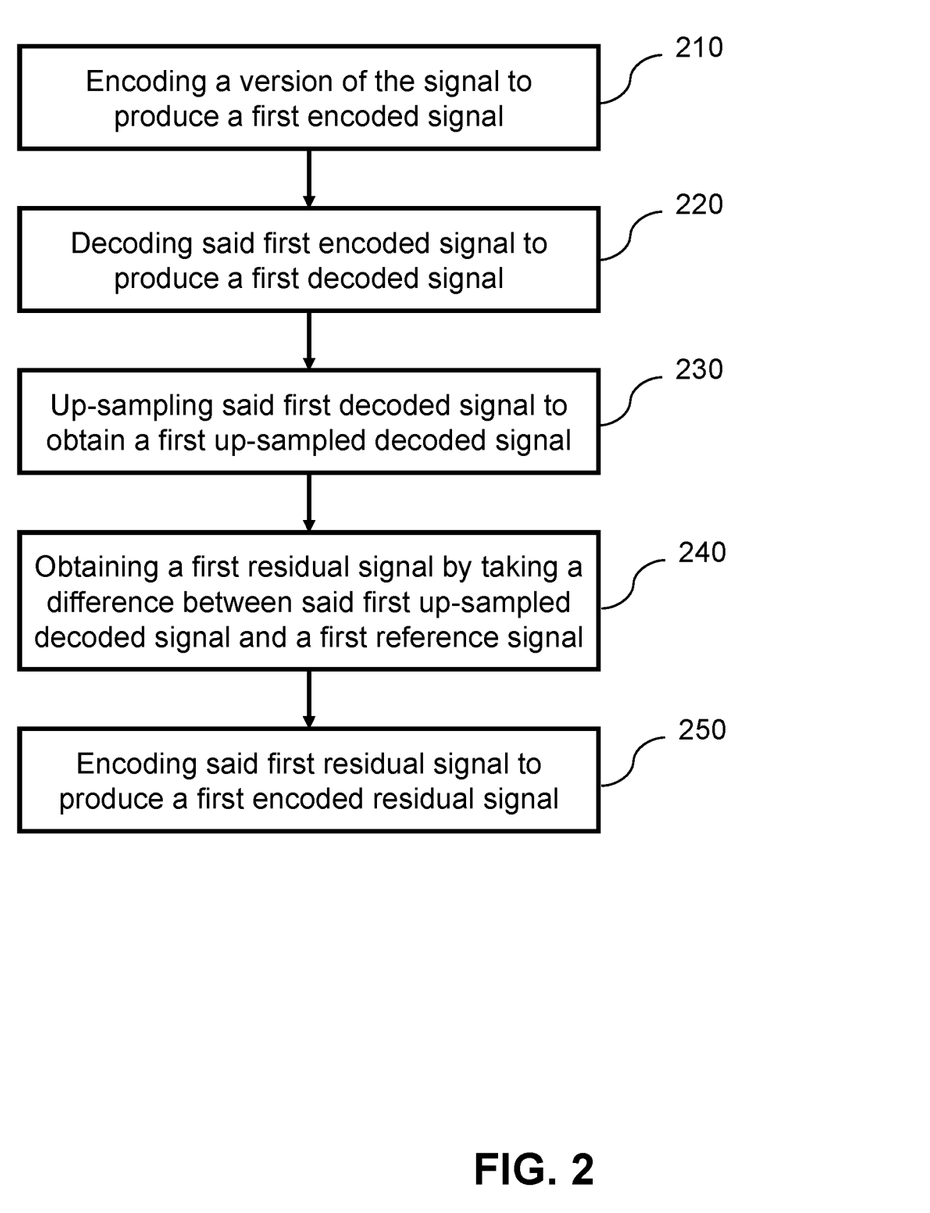
FIGS. 2 and 3 are flow charts showing methods of encoding.

FIG. 1 shows an example encoding system. FIG. 2 shows a method of encoding a signal that may be enacted by this system. The signal may be a video signal. The method comprises encoding a version of the signal to produce a first encoded signal 210, decoding said first encoded signal to produce a first decoded signal 220, up-sampling said first decoded signal to obtain a first up-sampled decoded signal 230, obtaining a first residual signal by taking a difference between said first up-sampled decoded signal and a first reference signal 240, and encoding said first residual signal to produce a first encoded residual signal 250.

Figure 3:
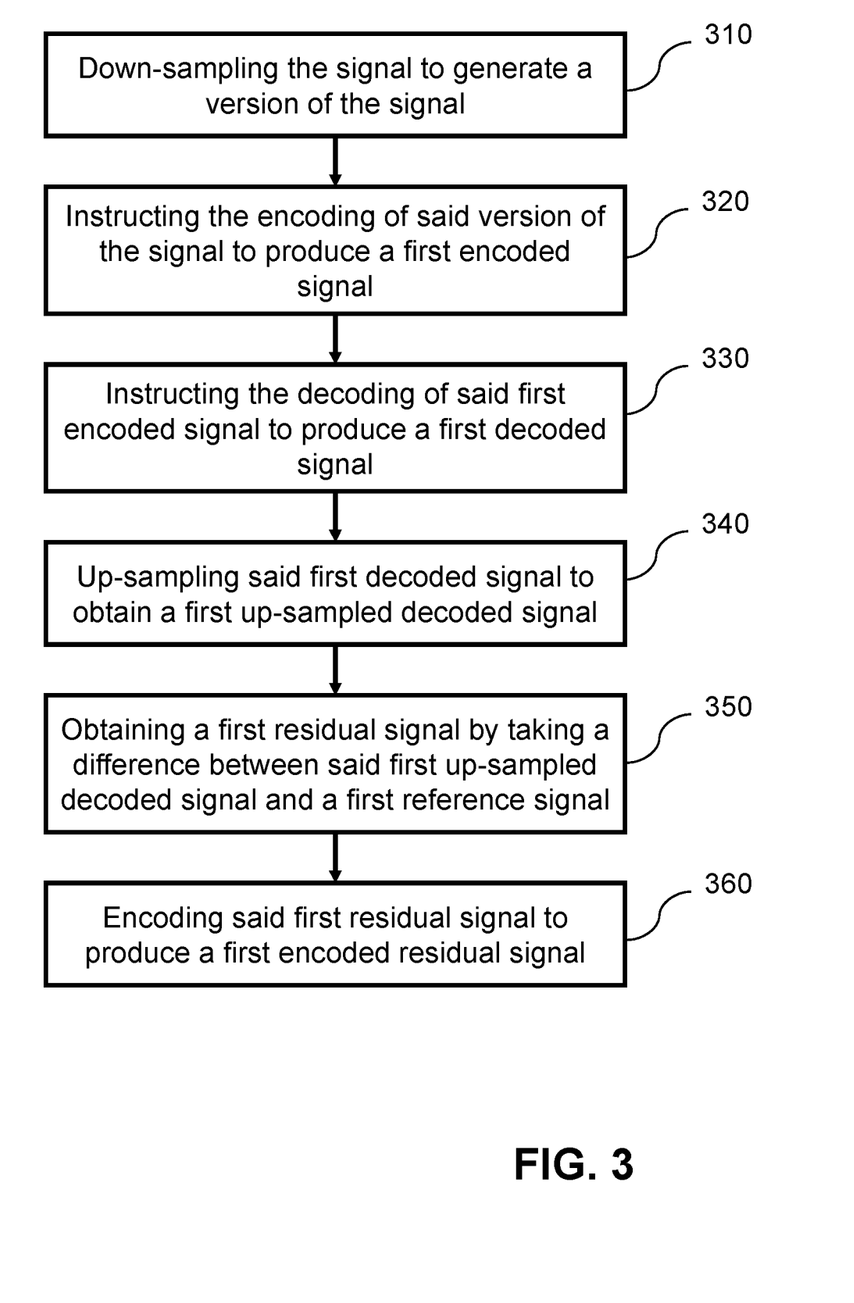

FIG. 3 shows a variation of the method of FIG. 2. The method of FIG. 3 includes an initial down-sampling step. The method may be performed or controlled by the enhancement encoder 125 or the encoding system. The method of FIG. 3 comprises down-sampling the signal to generate a version of the signal 310, instructing the encoding of said version of the signal to produce a first encoded signal 320, instructing the decoding of said first encoded signal to produce a first decoded signal 330, up-sampling said first decoded signal to obtain a first up-sampled decoded signal 340, obtaining a first residual signal by taking a difference between said first up-sampled decoded signal and a first reference signal 350, and encoding said first residual signal to produce a first encoded residual signal 360. In the method of FIG. 3, the first reference signal corresponds to the signal prior to down-sampling. The version of the signal is obtained by down-sampling the signal prior to encoding it. The first reference signal corresponds to the signal prior to down-sampling it.

To be more explicit in relating the methods of FIGS. 2 and 3 to FIG. 1, the signal down-sampled at step 310 comprises the input signal 100, the version of the signal produced at step 310 is the output of the down-sampler 105, the first encoded signal produced at step 210 or 320 is the encoded base data stream 120, the first up-sampled decoded signal is generated based on the output of the baseline decoder 115 that is received by the enhancement encoder 125, and the encoded first residual signal produced at step 250 or 360 is the encoded added data stream 130. The term "instructing" is used because the enhancement encoder 125 or another entity may instruct a digital chip that implements the baseline encoder 110 and the baseline decoder 115 to perform steps 210 and 220 of FIG. 2. The enhancement encoder 125 may also control the upsampling of the output of the baseline decoder 115 and the generation of a residual signal, e.g. by subtracting the upsampled output of the baseline decoder 115 from the input signal 105.

In the embodiment of FIG. 1, the first encoded signal (i.e. in the form of the encoded base data stream 120) may be seen to be produced using a first encoding algorithm. The first encoding algorithm may be a method implemented by the baseline encoder 110. Following this, the first encoded residual signal (i.e. in the form of the encoded added data stream 130) may be seen to be produced by using a second encoding algorithm. In this case, the second encoding algorithm may be a method implemented by the enhancement encoder 125. In certain cases, the first and second encoding algorithms are different.

In certain cases, the method of encoding a signal may be seen to encode the signal using at least two levels of encoding. A first level is encoded using a first encoding algorithm and a second level is encoded using a second encoding algorithm. In this case, the first level may correspond to a "baseline" level comprising the baseline encoder 110 and decoders 115, 120 and the second level may correspond to an "enhancement" level comprising the enhancement encoder 125 and the enhancement decoder 140. Each level may be seen to have corresponding signals. For example, the encoded base data stream 120 may comprise a first portion of a bitstream that is obtained by encoding the first level of the signal (e.g. a down-sampled version of the input signal 100), and the encoded added data stream 130 may comprise a second portion of a bitstream that is obtained by encoding the second level of the signal (e.g. a residual or difference signal that is generated by comparing an upsampled decoded signal from the baseline decoder 115 and the input signal 100).

The first and second portion of the bitstream may be combined to form a combined bytestream. The method may further comprise sending this combined bytestream to a decoder, e.g. encoded base data stream 120 and the encoded added data stream 130 may be combined in one bytestream that is decoded by the decoder, e.g. the decoder directs each portion of the bitstream to an appropriate one of the baseline decoder 135 and the enhancement decoder 140. In another case, the first portion of the bitstream and the second portion of the bitstream may be sent as two independent bitstreams. The encoded data may be sent as either a bitstream or a bytestream, depending on configurations.

Similarly to the description of encoding above, the first portion of the bitstream may be decoded using a first decoding algorithm, which may be implemented by the baseline decoder 135, and the second portion of the bitstream may be decoded using a second decoding algorithm, which may be implemented by the enhancement decoder 140. The first decoding algorithm may be implemented by a legacy decoder that is implemented using legacy hardware, wherein "legacy" here has its normal meaning of old or relating to a superseded model of decoder.

In certain examples, the "enhancement" level may be extended to generate multiple levels of residual signals. In this case, the method may further comprise decoding said first encoded residual signal to obtain a second decoded signal, obtaining a second residual signal by taking a difference between said second decoded signal and a second reference signal; and encoding said second residual signal to produce a second encoded residual signal. In this case, the second encoded residual signal may be produced by using the second encoding algorithm, e.g. as embodied within the enhancement encoder 125. Alternatively, the method may also further comprise decoding said first encoded residual signal to obtain a second decoded signal, up-sampling said second decoded signal to obtain a second up-sampled decoded signal, obtaining a second residual signal by taking a difference between said second up-sampled decoded signal and a second reference signal; and encoding said second residual signal to produce a second encoded residual signal. In this case, the second reference signal may correspond to the signal prior to down-sampling (i.e. the input signal 100), wherein the down-sampling of the second reference signal results in the first reference signal.

Referring back to FIGS. 2 and 3, corresponding decoding methods may also be provided. A method of decoding a signal may comprise: receiving a first encoded signal (e.g. the base data stream 120) and a first encoded residual signal (e.g. the added data stream 130), decoding said first encoded signal to obtain a first decoded signal (e.g. the output of the baseline decoder 135), up-sampling said first decoded signal to obtain a first up-sampled decoded signal (e.g. this may occur within the enhancement decoder 140), decoding said first encoded residual signal to obtain a first decoded residual signal (e.g. the enhancement decoder 140 decoding the encoded added data stream 130); and combining at least said first up-sampled decoded signal and said first decoded residual signal to obtain a first combined decoded signal (e.g. at the enhancement decoder 140 to output reconstructed signal 145, which is a reconstructed version of input signal 100). Hence, the methods applied at the decoder may correspond to the methods applied at the encoder.

In cases where a second encoded residual signal is generated, this may be received and decoded to obtain a second decoded residual signal. The first combined decoded signal and the second decoded residual signal may be combined to obtain a second combined decoded signal.

When the bitstream comprises first and second portions as described above, the method of decoding may further comprise selecting the first portion of the bitstream, decoding the first portion of the bitstream using a first decoding algorithm to obtain a first decoded portion of the signal, selecting the second portion of the bitstream, decoding the second portion of the bitstream using a second decoding algorithm to obtain a second decoded portion of the signal, and combining at least the first decoded portion and the second decoded portion to obtain a decoded combined signal. For example, the decoding system may be configured to parse a combined bit or byte stream and extract the various portions relating the encoded base data stream 120 and the encoded added data stream 130.

In certain cases, the portions of a bitstream, e.g. the signals at each layer may be identified using corresponding identifiers, e.g. the first portion is identified using a first identifier and the second portion is identified using a second identifier. The selection of the portions by the decoding system may then be performed by using said identifiers and determining the corresponding portions.

In one case, a method of decoding an encoded signal may be applied when the signal is encoded using at least two levels of encoding, where a first level is encoded using a first encoding algorithm (e.g. a "base" or "baseline" algorithm) and a second level is encoded using a second encoding algorithm (e.g. an "enhancement" algorithm). The method in this case may comprise obtaining a first bitstream, wherein the first bitstream is derived using the first encoding algorithm and corresponds to the first level of encoding, decoding said first bitstream using a first decoding algorithm to obtain a first decoded portion of the signal, obtaining a second bitstream, wherein the second bitstream is derived using the second encoding algorithm and corresponds to the second level of encoding, decoding said second bitstream using a second decoding algorithm to obtain a second decoded portion of the signal, and combining at least the first decoded portion and the second decoded portion to obtain a decoded combined signal. Decoding of the first portion may be performed by existing dedicated hardware designed to decode accordingly to the first decoding algorithm. Decoding the second portion may be performed using a software implementation (e.g. as implemented using a processor and memory) designed to decode accordingly to the second decoding algorithm, and wherein the combination of the first decoded portion and the second decoded portion is performed using the software implementation.

Given the example embodiments of FIGS. 1, 2 and 3, further variations will now be described.

A first variation relates to down-sampling, e.g. as performed by the down-sampler 105 or the down-sampling step 310. In one embodiment, the down-sampling operation is performed by a down-sampler which implements a separable filter with two or more separate kernels. For example, a two-dimensional filtering operation may be applied by applying a two-dimensional filter to a frame of video data. The two-dimensional filter may have a two-dimensional kernel, typically implemented as a matrix that is multiplied or convolved with elements of the frame. In certain cases, e.g. where the filter is separable, the two-dimensional filtering operation may be decomposed into multiple one-dimensional filtering operations. For example, a two-dimensional kernel may be defined as a product of two one-dimensional kernels. The two-dimensional filtering operation may be decomposed into a series of one-dimensional filtering operations using each of the one-dimensional kernels.

In the present case, a filtering kernel may be formed of two or more separate kernels, i.e. a plurality of separate kernels. Each kernel may relate to a different direction. In one case, each of the separate kernels may be capable of better preserving a specific direction when down-sampling. These directions may be, for example, vertical, horizontal, diagonal etc. The directions may be defined in relation to a two-dimensional frame, e.g. of video.

In one example, the plurality of separate kernels may be weighted by way of one or more weighting factors. This can be useful to ensure that certain directions are filtered more accurately than others. For example, if a frame contains mainly vertical direction elements (for example, a handrail) then the kernel which preserves better the vertical elements may be weighted more than the kernel(s) preserving other directions, so that the vertical elements are better preserved in the down-sampled frame. On the other hand, if a frame contains mainly horizontal directional elements (for example, a long shot of a savannah) then the kernel which preserves better the horizontal elements may be weighted more than the kernel(s) preserving other directions, so that the horizontal elements are better preserved in the down-sampled frame. A kernel that is weighted more than other kernels may be multiplied by a weighting factor that is greater than a weighting factor for the other kernels. The weighting factors for the separate kernels may be determined by analysing each frame. The weighting factors may be determined per frame. The kernels are weighted to differentially preserve different specific directions within the version of the signal, i.e. a first direction in the version of the signal may be preserved differently to a second direction in the version of the signal, e.g. by weighting a first kernel relating to the first direction using a weighting factor that is greater than a weighting factor for a second kernel relating to the second direction. In certain cases, two or more of the specific directions may be orthogonal (e.g. as is the case in two-dimensions for the horizontal and vertical directions).

Performing down-sampling according to this variation may help enhance the signal that is supplied to the base encoder 110. For example, emphasising or retaining certain directions within the video signal, may improve one or more of the encoded base data stream 120 and the encoded added data stream 130. Down-sampling in this manner may enable certain directions to be better preserved in the signal output by the baseline decoder 115, which in turn may influence the residual data generated by the enhancement encoder 125. For example, if edges in a particular direction are preserved or enhanced, and these are preserved in the output of the baseline decoder 115, this may lead to a reduced difference between an original reference and reconstructed frame, thus increasing the number of 0 or near 0 residual values, which may allow residual data to be efficiently compressed. By adapting the weighting factor or factors based on the content of the signal (e.g. of a frame of video), the signal sent to the baseline encoder 110 may be adapted to improve end appearance of the reconstructed signal (e.g. signal 145). This is somewhat unusual, as the baseline encoder 110 may be a legacy hardware encoder that is expecting normal lower-resolution video without enhancement (e.g. just standard video). However, it has been observed to provide improvements in certain situations.

A second variation relates to a transform operation that may be performed on the residual data generated by the enhancement encoder 125. In certain examples, the method comprises using a transform operation in order to process residuals planes in the enhancement layer, i.e. to generate planes of transformed residual data that represent the output of different directional transforms. As described above, the "enhancement" layer corresponds to the layer processed by the enhancement encoder 125 and the enhancement decoder 140. Residual data, e.g. the data that forms part of the residual signals discussed above (including the first residual signal), may be generated by comparing a reference frame and a reconstructed frame, e.g. by taking a difference between a reference frame and a reconstructed frame (e.g., an up-sampled decoded frame like that coming from the baseline decoder 115). The difference may be computed using element-wise subtraction (e.g. matrix subtraction if each of the two frames is represented as a two-dimensional array).

In the present variation, an (untransformed) residual plane may include residual information being the difference between a reference frame and a reconstructed frame. The frames may be frames of video. The enhancement layer may operate on a frame-by-frame basis, e.g. may determine residual data for a present frame from the input signal 100. In the case of a frame, such as a frame of video, this residual information may include edges, contours and details. For example, a reconstructed frame derived from the down-sampled signal, following encoding by the base encoder 110, decoding by the baseline decoder 115, and up-sampling by the enhancement encoder 125 may resemble a blurred version of the reference frame from the original input signal 100. The difference between the reference frame and the reconstructed frame may thus include detail for the higher resolution that is not present in the reconstructed frame. This detail typically appears as lines representing the fine edges of objects, texture details and points that act to sharpen the more blurred contours in the reconstructed frame.

In the second variation, the residual plane is processed by way of a transform which decomposes the residual plane into one or more transformed planes. The transformation converts the original residual values within the frame of residual data (the residual plane) into transformed values. These are then able to be encoded in a more efficient way. These transforms can correspond, for example, to the directional transforms described in PCT patent publication WO2013/171173 A1 or European patent publication No. EP2850829, by the same applicant and included herein by reference. The directional transform may be referred to as a directional decomposition. A directional transform may include, for example, four different kernels, each preserving better a specific direction in the residual plane, for example, horizontal, vertical and diagonal. One known example of such a kernel is a Hadamard transform. The directional transform may be applied to small coding blocks of residual data, e.g. 2×2 or 4×4 blocks. In these cases, the kernel of the directional transform may comprise a matrix that is multiplied with a flattened version of the coding blocks to generate a transformed block. For example, a 2×2 block may be flattened into a four-element vector and multiplied by a 4×4 matrix representing the kernel. In this case, each kernel may represent a row or column of the matrix that has matrix coefficients that are applied to the elements of the flattened vector to generate an output value for the specific direction (e.g. in an output vector of length 4, each element may represent a different direction of the transform). The output of applying the kernel, if it is provided as a one-dimensional vector, may be reshaped into a two-dimensional block. The output transformed residual plane may thus comprise tiled sets of transformed blocks. In one case, the output of each different kernel (e.g. representing a different direction) may be structured as an individual plane of residual data associated with that kernel (e.g. that direction). In this case, a frame of residual data may be transformed into four planes of transformed residual data. Either approach may be used.

In the present second variation, there is a proposed additional processing operation, e.g. that is in addition to the processing operation described in the patent publications referenced above. In this variation, the additional processing operation comprises weighting the different kernels by different weights. These different weights may be based, for example, on which direction is to be preserved better than other. Similar to the weighted down-sampling of the first variation, the weights may comprise one or more weighting factors that are applied to respective kernels. For example, if the residual plane has mainly vertical elements (e.g., vertical edges or contours), then the vertical transform may be weighted more than the other transform(s) so as to better preserve the vertical elements and, ultimately, obtain a more accurate reconstructed image when the residuals are decoded and added to the decoded frame. Applying weights may comprise multiplying rows or columns of a kernel matrix representing the different "direction" kernels by a determined factor value. A value greater than one may enhance the elements of the residual data and a value less than one may reduce the impact of the elements of the residual data. A value of 0 may remove the elements of that direction altogether. In certain case, the weights may be selected to sum to one across the set of directions.

In one example, the weights for each directional transform (e.g. for each kernel associated with each direction) are generated and then applied to the directional transforms. This may be performed by weighting the kernel itself, or by weighting the resultant transformed residual values.

Weighted down-sampling as per the first variation may be applied in combination with weighted transformation as per the second variation. These two variations may combine synergistically. This is because the preservation of certain details in the signal input to the baseline encoder 110, may lead to modified transformed residual values in a particular direction. Even though the baseline encoder 110 may encode the down-sampled signal in a complex non-linear manner, the linear weighting applied during down-sampling and transformation operations may provide an element of control, e.g. in the form of what directional aspects to preserve into the resultant encoded added data stream 130.

In one or more of the first and second variations, the weights may be chosen, for example, by an analysis of a frame to identify how many elements are in specific directions. For example, the method may include analysing one or more frames (or residual planes in the case the weights are applied to the transform), estimating the number of directional elements present and, based on this estimate, generating weights for the corresponding directions. By way of example, if the analysis determines that the relative percentage of elements is 70% horizontal and 30% vertical, then the weights may be 0.7 for the filter or transform preserving the horizontal dimension, and 0.3 for the filter or transform preserving the vertical dimension.

In the examples described herein, the encoding method may be seen as consisting of separating, in a signal, a structured component from a non-structured component. The structured component is encoded using a first encoding algorithm (a "base" or "baseline" algorithm), said algorithm being designed to optimally encode structured information. The unstructured component is encoded using a second encoding algorithm (an "enhancement" algorithm), said algorithm being designed to optimally encode unstructured information.

The structured component may correspond, for example, to a down-sampled image, audio signal or video frame, wherein the elements in the component are significantly spatially and/or temporally correlated. For example, a normal frame of video data has many elements that are spatially and/or temporally correlated. Many comparative encoding and decoding methods, such as the High Efficiency Video Coding (HEVC) standard, also known as H.265 and MPEG-H Part 2, or the Advanced Video Coding (AVC) standard, also referred to as H.264 or MPEG-4 Part 10, are designed to apply motion compensation for temporally correlated elements and to predict spatial elements within a frame based on spatially correlated elements. Hence, these approaches are based on structured components, and the corresponding encoding and decoding algorithms are optimised for these components. To supply a second data stream at a higher resolution that the encoded base stream 120 would require the baseline encoder 110 to be applied again to the higher resolution stream (e.g. at the resolution of the original input signal 100). This leads to a high required bitrate for transmissions.

On the other hand, the presently described examples encode an additional unstructured component using a second encoding approach that is optimised for unstructured data. This leads to a lower bitrate, and greater efficiencies, in supplying both a low-resolution and high-resolution encoded data stream. As described herein, an unstructured component may correspond, for example, to residual data. This may have some spatial and/or temporal correlation but, in general, resembles more a sparse set of data. It has properties that are quite different to a conventional frame of (structured) video. For example, because the residual data is based on a difference between an original input signal (e.g. an input or reference frame) and an up-sampled version of a previously down-sampled signal (e.g. a reconstructed frame), in many cases the difference may be 0, which means statistical measures like the signal mean and median are near 0. The unstructured component may be determined on a frame basis and may thus not require dependencies across multiple frames (e.g. as found in motion compensation encoding) and also do not require complex spatial prediction within frames, which may lead to artifacts and instabilities. This provides advantages as compared to encoding two structured components using the same encoding strategy but at different resolutions. The transforms that are described herein are applied to the unstructured or sparse data. The transformations may be particularly adapted for this form of data.

As described herein, both the encoder and decoder may be implemented within a variety of devices, including, for example, a streaming server or a client device, or server or client device that decodes from a data store. As described, various methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed FPGA may provide certain efficiencies. Reference to software as used herein also applies to a hardware computer system processing said software, e.g. a memory to store computer program code and one or more processors to execute the computer program code. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). Generally, any of the functionality described in this text or illustrated in the figures can be implemented using software, firmware (e.g., fixed logic circuitry), programmable or nonprogrammable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of encoding a video signal using down-sampled data that is generated via a decomposition process that is performed on a down-sampling operation, the method comprising:
   decomposing the down-sampling operation, wherein the down-sampling operation comprises down-sampling a frame of the video signal to generate a version of the video signal, and wherein said decomposing includes:
      selecting a separable, two-dimensional filter structured to implement a two-dimensional filtering operation; and
      decomposing the two-dimensional filtering operation into a series of multiple one-dimensional filtering operations;
   analyzing, in an image space, the frame to identify a first set of elements associated with a first directional image property and a second set of elements associated with a second directional image property;

based on said analyzing, determining that the first set of elements is to be prioritized over the second set of elements;

performing a linear weighted down-sampling operation by down-sampling the frame of the video signal to create the version of the video signal and by executing, against the frame, each one-dimensional filtering operation included in the series of multiple one-dimensional filtering operations with linear weighted priority being given to whichever one-dimensional filtering operation is structured to preserve the first set of elements, wherein said linear weighted down-sampling operation causes the first set of elements to be better preserved as compared to the second set of elements, wherein the linear weighted priority is adapted based on content identified within the video signal, and wherein the linear weighted down-sampling operation is applied in combination with a weighted transformation;

instructing an encoding of said version of the video signal to produce a first encoded signal;

instructing a decoding of said first encoded signal to produce a first decoded signal, wherein the first set of elements are preserved within the first decoded signal based on said prioritized one-dimensional filtering operation being prioritized;

up-sampling said first decoded signal to obtain a first up-sampled decoded signal;

obtaining a first residual signal by taking a difference between said first up-sampled decoded signal and a first reference signal, wherein the first reference signal corresponds to the video signal prior to down-sampling, and wherein, as a result of the first set of elements being preserved within the first decoded signal, a number of 0 or near 0 residual values in the first residual signal is increased as compared to a number of 0 or near 0 residual values that would otherwise be produced if the first set of elements was not preserved within the first decoded signal;

encoding said first residual signal to produce a first encoded residual signal, said encoding including the weighted transformation, which includes transforming the first residual signal into a first transformed residual signal, wherein:

said weighted transformation comprises generating a modified version of a block of the first residual signal, said weighted transformation further comprises applying a directional transformation to the modified version of the block to generate a vector output, the directional transformation comprising a plurality of different kernels, each kernel in the plurality of different kernels corresponding to a specific direction within the first residual signal, said weighted transformation further comprises reshaping the vector output to facilitate generation of the first transformed residual signal;

the plurality of different kernels are weighted by different weights, the weights act to differentially preserve different specific directions within the first residual signal, such that the combination of the linear weighted down-sampling operation and the weighted transformation facilitate control over what directional aspects are preserved in a resultant single bit stream, and the frame of the video signal is analyzed to generate its own corresponding set of weights, which are used to weight the plurality of different kernels; and combining the first encoded signal and the first encoded residual signal into the resultant single bit stream, wherein each portion of the first encoded signal is tagged with a same first identifier, enabling identification of the first encoded signal within the resultant single bit stream, wherein each portion of a second encoded signal is tagged with a same second identifier, enabling identification of the first encoded residual signal within the resultant single bit stream, and wherein the resultant single bit stream is parsable, enabling extraction of the first encoded signal and the first encoded residual signal from the resultant single bit stream, said extraction being facilitated via use of the first identifier and the second identifier.

2. The method of claim 1, wherein a down-sampler performs the linear weighted down-sampling operation, and wherein the down-sampler comprises or is associated with the plurality of different kernels.

3. The method of claim 2, wherein the specific directions associated with the plurality of different kernels comprise two or more of horizontal, vertical and diagonal directions.

4. The method of claim 1, wherein:

encoding the version of the video signal to produce the first encoded signal comprises encoding structured information using a first encoding algorithm optimized for encoding structured information; and encoding said first residual signal to produce the first encoded residual signal comprises encoding unstructured information using a second encoding algorithm optimized for encoding unstructured information.

5. The method of claim 4, wherein the structured information comprises signal elements that have a first level of spatial and/or temporal correlation and the unstructured information comprises residual data that has a second level of spatial and/or temporal correlation, the first level being higher than the second level.

6. The method of claim 1, wherein the first residual signal comprises a sparse set of data.

7. An encoder configured to:

decompose a down-sampling operation, wherein the down-sampling operation comprises down-sampling a frame of a video signal to generate a version of the video signal and wherein said decomposing includes:

selecting a separable, two-dimensional filter structured to implement a two-dimensional filtering operation; and decomposing the two-dimensional filtering operation into a series of multiple one-dimensional filtering operations;

analyze, in an image space, the frame to identify a first set of elements associated with a first directional image property and a second set of elements associated with a second directional image property;

based on said analyzing, determine that the first set of elements is to be prioritized over the second set of elements;

perform a linear weighted down-sampling operation by down-sampling the frame of the video signal to create the version of the video signal and by executing, against the frame, each one-dimensional filtering operation included in the series of multiple one-dimensional filtering operations with linear weighted priority being given to whichever one-dimensional filtering operation is structured to preserve the first set of elements, wherein said linear weighted down-sampling operation causes the first set of elements to be better preserved as compared to the second set of elements, wherein the linear weighted priority is adapted based on content identified within the video signal, and wherein the linear weighted down-sampling operation is applied in combination with a weighted transformation;

instruct encoding of said version of the video signal to produce a first encoded signal;

instruct decoding of said first encoded signal to produce a first decoded signal, wherein the first set of elements are preserved within the first decoded signal based on said prioritized one-dimensional filtering operation being prioritized;

up-sample said first decoded signal to obtain a first up-sampled decoded signal;

obtain a first residual signal by taking a difference between said first up-sampled decoded signal and a first reference signal, wherein the first reference signal corresponds to the video signal prior to down-sampling, wherein, as a result of the first set of elements being preserved within the first decoded signal, a number of 0 or near 0 residual values in the first residual signal is increased as compared to a number of 0 or near 0 residual values that would otherwise be produced if the first set of elements was not preserved within the first decoded signal; and encode said first residual signal to produce a first encoded residual signal, wherein said encoding includes the weighted transformation, which includes transforming the first residual signal into a first transformed residual signal, wherein:
  said weighted transformation comprises generating a modified version of a block of the first residual signal,
  said weighted transformation further comprises applying a directional transformation to the modified version of the block to generate a vector output, the directional transformation comprising a plurality of different kernels, each kernel in the plurality of different kernels corresponding to a specific direction within the first residual signal,
  said weighted transformation further comprises reshaping the vector output to facilitate generation of the first transformed residual signal,
  the plurality of different kernels are weighted by different weights,
  the weights act to differentially preserve different specific directions within the first residual signal, such that the combination of the linear weighted down-sampling operation and the weighted transformation facilitate control over what directional aspects are preserved in a resultant single bit stream, and
  each frame of the video signal is analyzed to generate its own corresponding set of weights, which are selectively used to weight the plurality of different kernels; and combine the first encoded signal and the first encoded residual signal into the resultant single bit stream, wherein each portion of the first encoded signal is tagged with a same first identifier, enabling identification of the first encoded signal within the resultant single bit stream, wherein each portion of a second encoded signal is tagged with a same second identifier, enabling identification of the first encoded residual signal within the resultant single bit stream, and wherein the resultant single bit stream is parsable, enabling extraction of the first encoded signal and the first encoded residual signal from the resultant single bit stream, said extraction being facilitated via use of the first identifier and the second identifier.

8. A non-transitory computer-readable storage medium comprising instructions which when executed by a processor cause the processor to:

decompose a down-sampling operation, wherein the down-sampling operation comprises down-sampling a frame of a video signal to generate a version of the video signal, and wherein said decomposing includes:
  selecting a separable, two-dimensional filter structured to implement a two-dimensional filtering operation; and
  decomposing the two-dimensional filtering operation into a series of multiple one-dimensional filtering operations;

analyze, in an image space, the frame to identify a first set of elements associated with a first directional image property and a second set of elements associated with a second directional image property;

based on said analyzing, determine that the first set of elements is to be prioritized over the second set of elements;

perform a linear weighted down-sampling operation by the frame of the video signal to create the version of the video signal and by executing, against the frame, each one-dimensional filtering operation included in the series of multiple one-dimensional filtering operations with linear weighted priority being given to whichever one-dimensional filtering operation is structured to preserve the first set of elements, wherein said linear weighted down-sampling operation causes the first set of elements to be better preserved as compared to the second set of elements, wherein the linear weighted priority is adapted based on content identified within the video signal, and wherein the linear weighted down-sampling operation is applied in combination with a weighted transformation;

instruct encoding of said version of the video signal to produce a first encoded signal;

instruct decoding of said first encoded signal to produce a first decoded signal, wherein the first set of elements are preserved within the first decoded signal based on said prioritized one-dimensional filtering operation being prioritized;

up-sample said first decoded signal to obtain a first up-sampled decoded signal;

obtain a first residual signal by taking a difference between said first up-sampled decoded signal and a first reference signal, wherein the first reference signal corresponds to the video signal prior to down-sampling, wherein, as a result of the first set of elements being preserved within the first decoded signal, a number of 0 or near 0 residual values in the first residual signal is increased as compared to a number of 0 or near 0 residual values that would otherwise be produced if the first set of elements was not preserved within the first decoded signal; and encode said first residual signal to produce a first encoded residual signal, wherein said encoding includes the weighted transformation, which includes transforming the first residual signal into a first transformed residual signal, wherein:

said weighted transformation comprises generating a modified version of a block of the first residual signal, said weighted transformation further comprises applying a directional transformation to the modified version of the block to generate a vector output, the directional transformation comprising a plurality of different kernels, each kernel in the plurality of different kernels corresponding to a specific direction within the first residual signal, said weighted transformation further comprises reshaping the vector output to facilitate generation of the first transformed residual signal, the plurality of different kernels are weighted by different weights, the weights act to differentially preserve different specific directions within the first residual signal, such that the combination of the linear weighted down-sampling operation and the weighted transformation facilitate control over what directional aspects are preserved in a resultant single bit stream, and each frame of the video signal is analyzed to generate its own corresponding set of weights, which are selectively used to weight the plurality of different kernels; and combine the first encoded signal and the first encoded residual signal into the resultant single bit stream, wherein each portion of the first encoded signal is tagged with a same first identifier, enabling identification of the first encoded signal within the resultant single bit stream, wherein each portion of a second encoded signal is tagged with a same second identifier, enabling identification of the first encoded residual signal within the resultant single bit stream, and wherein the resultant single bit stream is parsable, enabling extraction of the first encoded signal and the first encoded residual signal from the resultant single bit stream, said extraction being facilitated via use of the first identifier and the second identifier.

9. The method of claim 1, wherein an encoder performs the encoding of the first encoded residual signal, and wherein the encoder receives three inputs to perform said encoding, said three inputs comprising (i) the frame of the video signal, (ii) the version of the video signal, which is a down-sampled version of the input signal, and (iii) the first decoded signal.

10. The method of claim 1, wherein the first encoded signal is identified via a first identifier in the resultant single bit stream, and wherein the first encoded residual signal is identified via a second identifier in the resultant single bit stream.

11. The method of claim 10, wherein parsing the resultant single bit stream is performed via use of the first identifier and the second identifier.

12. The method of claim 1, wherein the weighted transformation processes residual planes of the first encoded residual signal.

13. The method of claim 12, wherein the weighted transformation processes the residual planes, resulting in generation of planes of transformed residual data that represent different directional transforms.

14. The method of claim 1, wherein taking the difference between the first up-sampled decoded signal and the first reference signal includes performing an element-wise subtraction.

15. The method of claim 1, wherein a majority of elements in a residual plane of the first encoded residual signal are vertical elements.

* * * * *